(12) United States Patent
Szucs et al.

(10) Patent No.: US 9,781,137 B2
(45) Date of Patent: Oct. 3, 2017

(54) FAKE BASE STATION DETECTION WITH CORE NETWORK SUPPORT

(71) Applicant: NOKIA SOLUTIONS AND NETWORKS OY, Espoo (FI)

(72) Inventors: Laszlo Szucs, Budapest (HU); Laszlo Csik, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 6 days.

(21) Appl. No.: 14/434,445

(22) PCT Filed: Oct. 11, 2012

(86) PCT No.: PCT/EP2012/070173
§ 371 (c)(1),
(2) Date: Apr. 9, 2015

(87) PCT Pub. No.: WO2014/056538
PCT Pub. Date: Apr. 17, 2014

(65) Prior Publication Data
US 2015/0271194 A1    Sep. 24, 2015

(51) Int. Cl.
*H04L 29/06* (2006.01)
*H04W 12/06* (2009.01)
*H04W 12/12* (2009.01)

(52) U.S. Cl.
CPC ...... *H04L 63/1416* (2013.01); *H04L 63/0869* (2013.01); *H04L 63/126* (2013.01); *H04W 12/06* (2013.01); *H04W 12/12* (2013.01)

(58) Field of Classification Search
CPC ............ H04L 63/1416; H04L 63/1408; H04L 63/0876; H04W 12/12
See application file for complete search history.

(56) References Cited

U.S. PATENT DOCUMENTS

| | | | |
|---|---|---|---|
| 7,856,656 B1* | 12/2010 | Kharvandikar | H04L 63/1408 370/230 |
| 2005/0060576 A1* | 3/2005 | Kime | H04L 63/1425 726/4 |
| 2005/0128989 A1* | 6/2005 | Bhagwat | H04K 3/65 370/338 |

(Continued)

FOREIGN PATENT DOCUMENTS

WO    WO 2012091529 A2 *  7/2012  ............ H04W 12/12

OTHER PUBLICATIONS

Elad Barkan, et al.; "Instant Ciphertext-Only Cryptanalysis of GSM Encrypted Communication"; 2003, pp. 600-616.

(Continued)

*Primary Examiner* — David Pearson
(74) *Attorney, Agent, or Firm* — Harrington & Smith

(57) ABSTRACT

The present invention provides methods, apparatuses and computer program product relating to fake base station detection with core network support. The present invention includes receiving, at a core network, context information from a user equipment, receiving, at the core network, context information from at least one network element, and determining, at the core network, whether the context information received from the user equipment coincides with the context information received from the network element.

18 Claims, 11 Drawing Sheets

S31. Mobile App constantly monitors connection and context information from UE

S32. In case of a suspicious event, it sends the gathered information via secure channel S33. Service gets connection and context information from core network, which is needed for the decision S34. Service compares the received information and sends back the answer whether the BTS is valid

(56) References Cited

U.S. PATENT DOCUMENTS

| | | | |
|---|---|---|---|
| 2006/0068811 A1* | 3/2006 | Adya | H04W 12/12 455/456.2 |
| 2006/0193284 A1* | 8/2006 | Stieglitz | H04L 63/0492 370/328 |
| 2007/0049323 A1* | 3/2007 | Wang | H04W 12/12 455/525 |
| 2007/0115886 A1 | 5/2007 | Davis et al. | 370/331 |
| 2009/0104889 A1* | 4/2009 | Lotvonen | H04L 63/1441 455/410 |
| 2009/0149194 A1* | 6/2009 | Howard | H04W 64/003 455/456.1 |
| 2010/0106966 A1* | 4/2010 | Santos | H04L 12/66 713/156 |
| 2011/0148579 A1 | 6/2011 | Strzelczyk et al. | 340/10.1 |
| 2011/0151796 A1* | 6/2011 | Walby | B60R 25/2072 455/67.7 |
| 2013/0040603 A1* | 2/2013 | Stahlberg | H04L 63/126 455/410 |
| 2013/0097711 A1* | 4/2013 | Basavapatna | H04W 4/02 726/25 |
| 2014/0036696 A1* | 2/2014 | Lee | H04W 48/18 370/252 |
| 2014/0304770 A1* | 10/2014 | Jung | H04W 12/12 726/2 |
| 2015/0140997 A1* | 5/2015 | Goldfarb | H04W 8/02 455/424 |

OTHER PUBLICATIONS

CatcherCatcher Project; https://opensource.srlabs.de/projects/mobile-network-assessment-tools/wiki/CatcherCatcher, (2 pages).

Barbeau, Michel, et al., "Rogue-Base Station Detection in WiMax/802.16 Wireless Access Networks", 2006, School of Computer Science, Carleton University, 14 pgs.

* cited by examiner

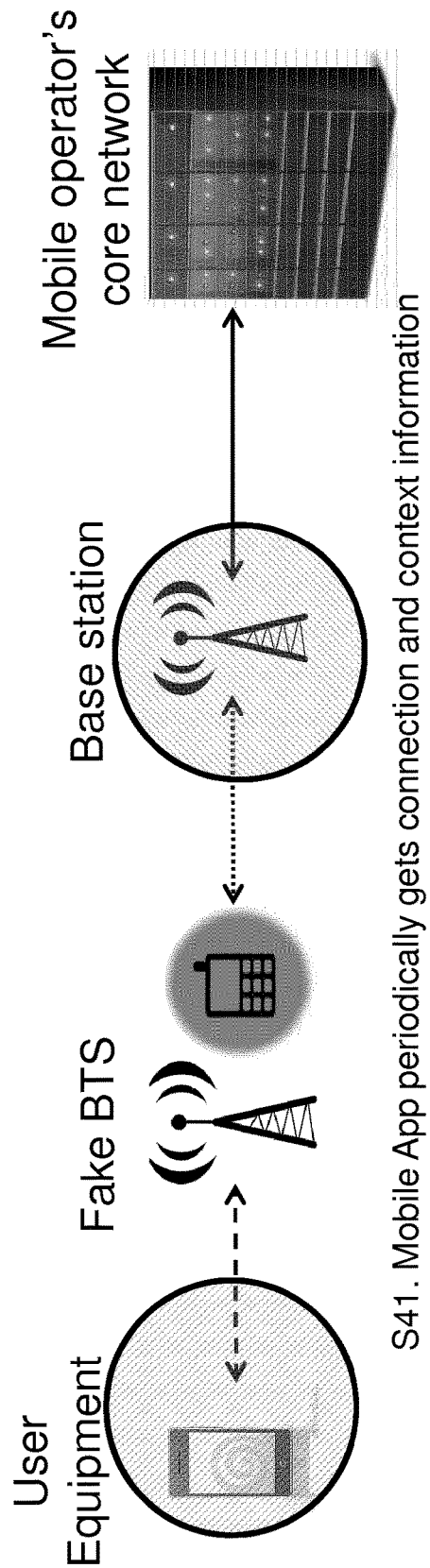

Fig. 4

S41. Mobile App periodically gets connection and context information from core network from network service via secure channel S42. Mobile App constantly monitors connection and context information from UE S43. In case of a suspicious event, Mobile App uses the stored information and determines if a fake BTS is present S44. Optionally, Mobile App notifies the network service via secure channel that a fake BTS is present

Fig. 5

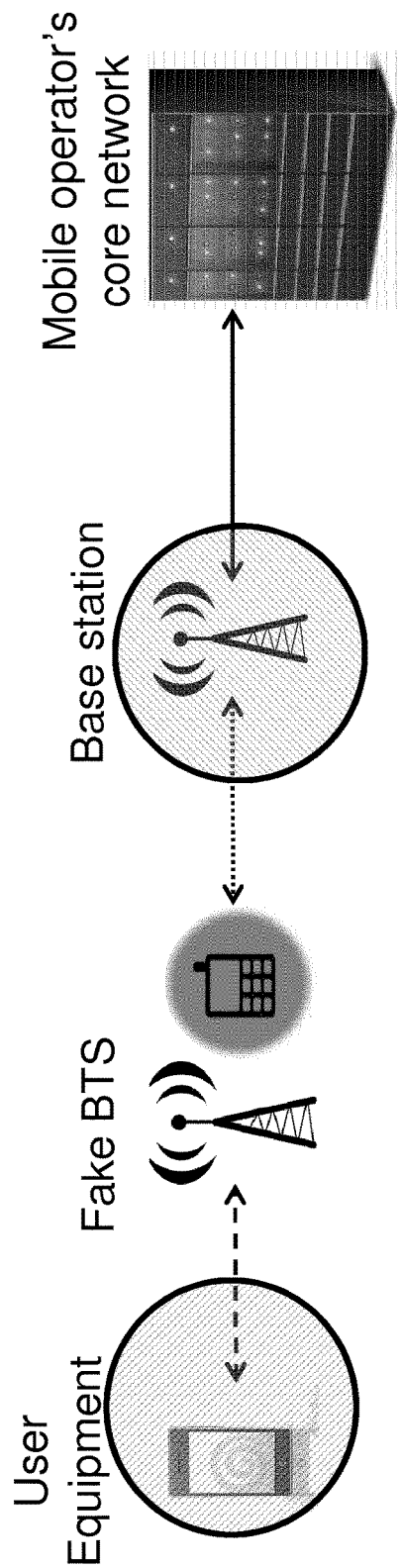

S51. Mobile App constantly monitors connection and context information from UE

S52. In case of a suspicious event, Mobile App gets connection and context information from core network from the network service via secure channel S53. Mobile App uses the retrieved information and determines if a fake base station is present S54. Optionally, Mobile App notifies the network service via secure channel that a fake BTS is present

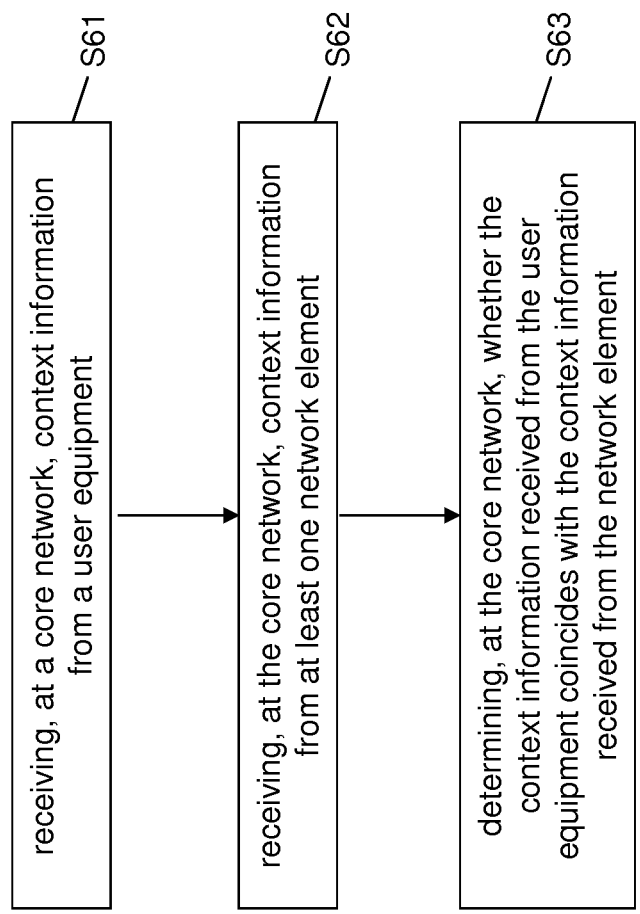

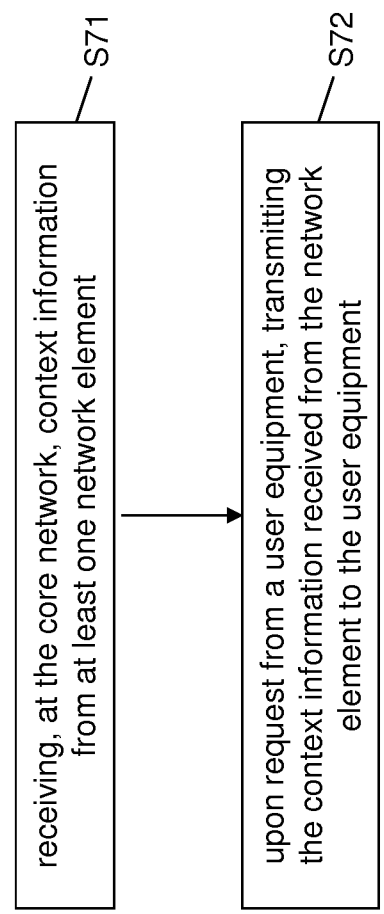

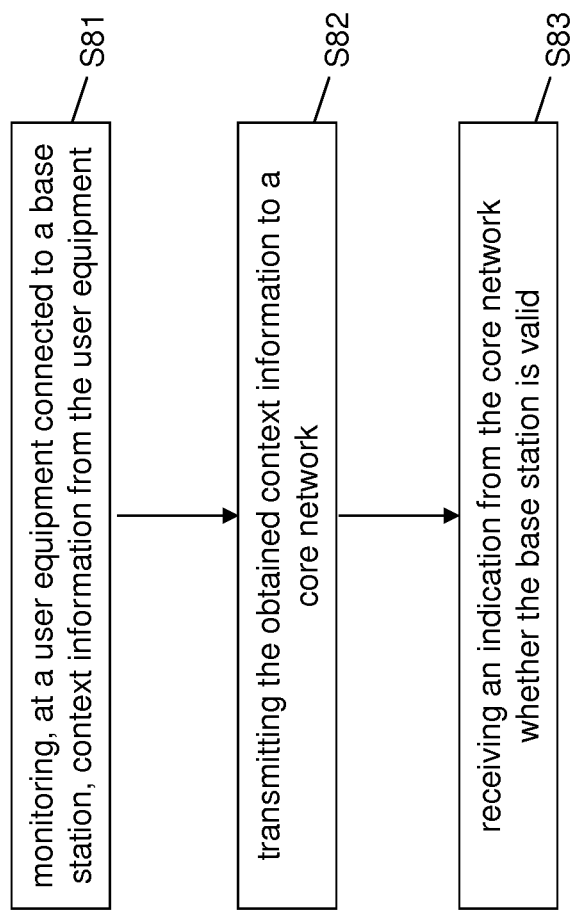

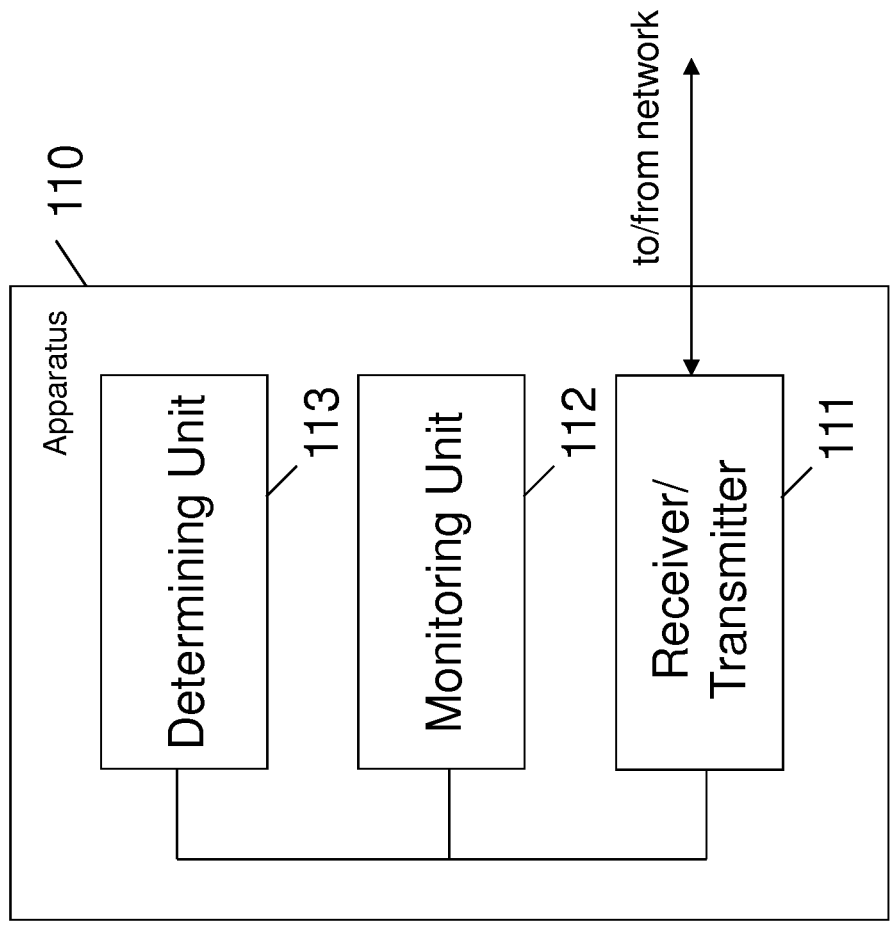

FAKE BASE STATION DETECTION WITH CORE NETWORK SUPPORT

FIELD OF THE INVENTION

The present invention relates to apparatuses, methods and a program for fake base station detection with core network support.

BACKGROUND OF THE INVENTION

A fake access point in WLAN (wireless local area network) systems is a wireless access point that has either been installed on a secure company network by an internal without explicit authorization from a local network administrator or has been maliciously added to the system to allow a hacker to conduct a man-in-the-middle attack. In telecommunication, the access point is a base station (BTS).

With a fake BTS the attacker can compromise the communication of a selective set of users (usually only one target) by performing a man-in-the-middle attack between the UE (user equipment) and the real BTS. On the one hand, it acts as a BTS with the strongest signal towards the UE and, on the other hand, acts as a UE towards the core network (and towards a real BTS). A fake BTS can be used to perform eavesdropping (passively listening the conversation), but it can also actively alter the communication flow.

In the specification of 2G (second generation mobile systems), the BTS is not authenticated to the user equipment, making it possible to use a fake base station.

FIG. 1 is an overview illustrating a normal situation in a communication network and FIG. 2 is an overview illustrating a situation in a communication network when there is a man-in-the-middle attack.

In current GSM systems, some encryption algorithms are defined. Of these algorithms, A5/0 to A5/2 are proved to be rather weak encryption algorithms and A5/3, A5/4 are algorithms that are still strong and are considered to be hard to break.

Most 2G systems use A5/1 encryption that can now be cracked in real-time with available equipment. Inserting a device into a mobile system that acts as a fake BTS and can crack A5/1 in real time makes many new attacks feasible that were not considered to be a threat earlier (cf. document [4] mentioned below). Such attacks include but are not limited to breaking GPRS (General Packet Radio Service) communication, impersonating a user and charging calls to him, and eavesdropping otherwise secure communication.

Currently, all GSM (Global System for Mobile Communication) UEs support A5/1. Even when a mobile operator upgrades its base stations to support strong encryption protocols (for example, A5/3), which is very rare nowadays, the UE can be lured by a fake BTS to establish a weak (A5/1) connection since the used encryption algorithm is selected by the BTS.

To prevent the installation of fake access points into a WLAN system, organizations can install wireless intrusion prevention systems to monitor the radio spectrum for unauthorized access points. However this is way too expensive in case of a mobile network operator, where the whole country should be covered. Targeted attacks using limited range or directed antennas may not be noticed by other entities anyway. Therefore, another solution is needed.

Some basic approaches are described in the references [1] to [3] mentioned below. However, so far there are no widely available solutions known to reliably detect a fake BTS. Current solutions require special hardware and some are not even publicly available. The CatcherCatcher project (cf. reference [3]) is an ongoing activity to generate alarms on various phone platforms, if the presence of a fake BTS is suspected. The project however, not revealed any particular results yet. Moreover alone the UE cannot be certain in all cases that it camps on a fake BTS. Having too much false alarms is a barrier of getting wide acceptance.

REFERENCES

[1]: "Apparatus And Method For Detecting A Cloned Base Station", United States Patent Application US 2011/0151796 A1.

[2]: "Rogue-Base Station Detection in WiMax/802.16 Wireless Access Networks", Michel Barbeau, School of Computer Science, Carleton University; Jean-Marc Robert, Alcatel, CTO Security Research and Competence Center. http://people.scs.carleton.ca/~barbeau/Publications/2006/at_2006.pdf

[3]: CatcherCatcher project, (http://opensource.srlabs.de/projects/catcher/wiki).

[4]: Instant Ciphertext-Only Cryptanalysis of GSM Encrypted Communication; Elad Barkan, Eli Biham, Nathan Keller, Computer Science Department Technion, Isreal Institute of Technology, (http://cryptome.org/gsm-crack-bbk.pdf).

SUMMARY OF THE INVENTION

It is therefore an object of the present invention to overcome the above drawbacks and to provide methods, apparatuses and a program for fake base station detection with core network support.

According to an aspect of the present invention there is provided a method comprising:
  receiving, at a core network, context information from a user equipment,
  receiving, at the core network, context information from at least one network element,
  determining, at the core network, whether the context information received from the user equipment coincides with the context information received from the network element.

According to further refinements of the present invention as defined under the above aspect, the method further comprises
  determining, if the context information received from the user equipment coincides with the context information received from the network element, that a base station to which the user equipment is connected, is a valid base station;
  transmitting a message to the user equipment informing the user equipment that the base station to which the user equipment is connected, is a valid base station;
  determining, if the context information received from the user equipment does not coincide with the context information received from the network element, that a base station to which the user equipment is connected, is a fake base station;
  transmitting a message to the user equipment informing the user equipment that the base station to which the user equipment is connected, is a fake base station;

According to another aspect of the present invention there is provided a method comprising:
  receiving, at the core network, context information from at least one network element, and upon request from a user equipment, transmitting the context information received from the network element to the user equipment.

According to another aspect of the present invention there is provided a method comprising:

monitoring, at a user equipment connected to a base station, context information from the user equipment, transmitting the obtained context information to a core network, and receiving an indication from the core network whether the base station is valid.

According to another aspect of the present invention there is provided a method comprising:

monitoring, at a user equipment connected to a base station, context information from the user equipment, and determining, at the user equipment, whether the context information from the user equipment coincides with context information obtained from a core network.

According to further refinements of the present invention as defined under the above aspect, the method further comprises querying, by the user equipment, the context information from the core network periodically and storing the context information;

querying, by the user equipment, the context information from the core network in response to observation of a predetermined event;

determining, if the monitored context information from the user equipment does not coincide with the context information obtained from the core network, that the base station to which the user equipment is connected, is a fake base station;

transmitting a message to the core network informing the core network that the base station to which the user equipment is connected, is a fake base station;

wherein context information includes at least one of information about available base stations in the neighborhood of the user equipment, a position of the user equipment, a sensed position of the base station, a time taken to set up a connection between the user equipment and the base station, and information about an indication of an authentication request to the user equipment.

According to another aspect of the present invention there is provided an apparatus comprising:

a receiver configured to receive context information from a user equipment, and to receive context information from at least one network element, and a determining unit configured to determine whether the context information received from the user equipment coincides with the context information received from the network element.

According to further refinements of the present invention as defined under the above aspect the determining unit is further configured to determine, if the context information received from the user equipment coincides with the context information received from the base station, that the base station to which the user equipment is connected, is a valid base station;

the apparatus further comprises a transmitter configured to transmit a message to the user equipment informing the user equipment that the base station to which the user equipment is connected, is a valid base station;

the determining is further configured to determine, if the context information received from the user equipment does not coincide with the context information received from the base station, that the base station to which the user equipment is connected, is a fake base station:

the apparatus further comprises a transmitter configured to transmit a message to the user equipment informing the user equipment that the base station to which the user equipment is connected, is a fake base station;

According to another aspect of the present invention there is provided an apparatus comprising:

a receiver configured to receive context information from at least one network element, and a transmitter configured to transmit, upon request from a user equipment, the context information received from the network element to the user equipment.

According to another aspect of the present invention there is provided an apparatus comprising:

a monitoring unit configured to monitor context information from a user equipment, a transmitter configured to transmit the obtained context information to a core network, and a receiver configured to receive an indication from the core network whether a base station to which the user equipment is connected, is valid.

According to another aspect of the present invention there is provided an apparatus comprising:

a monitoring unit configured to monitor context information from a user equipment, and a determining unit configured to determine, whether the context information from the user equipment coincides with context information obtained from a core network.

According to further refinements of the present invention as defined under the above aspect, the apparatus further comprises a querying unit configured to query the context information from the core network periodically and a storing unit configured to store the context information;

a querying unit configured to query the context information from the core network in response to observation of a predetermined event;

wherein the determining unit is further configured to determine, if the monitored context information from the user equipment does not coincide with the context information obtained from the core network, that a base station to which the user equipment is connected, is a fake base station;

a transmitter configured to transmit a message to the core network informing the core network that the base station to which the user equipment is connected, is a fake base station;

wherein context information includes at least one of information about available base stations in the neighborhood of the user equipment, a position of the user equipment, a sensed position of the base station, a time taken to set up a connection between the user equipment and the base station, and information about an indication of an authentication request to the user equipment.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which:

FIG. 4 is a diagram illustrating a second scenario of how to detect a fake base station according to an aspect of the present invention.

FIG. 5 is a diagram illustrating a third scenario of how to detect a fake base station according to an aspect of the present invention.

FIG. 6 is a flowchart illustrating a method according to certain aspects of the present invention.

FIG. 7 is a flowchart illustrating another method according to certain aspects of the present invention.

FIG. 8 is a flowchart illustrating still another method according to certain aspects of the present invention.

FIG. 11 is a block diagram showing another example of an apparatus according to certain aspects of the present invention.

DETAILED DESCRIPTION

Figure 1:
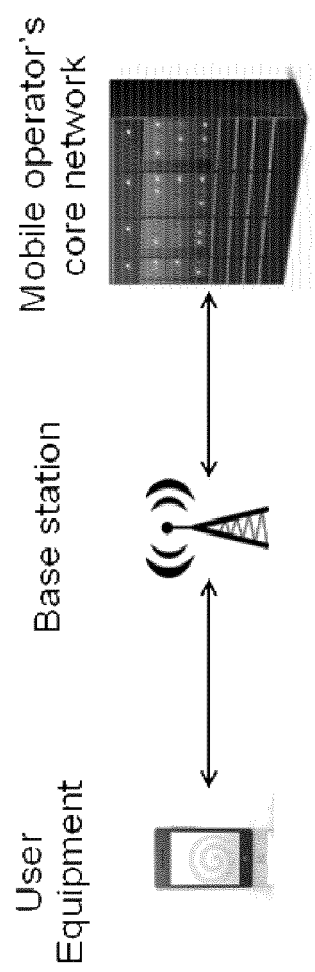
FIG. 1 is an overview illustrating a normal situation in a communication network.
Figure 2:
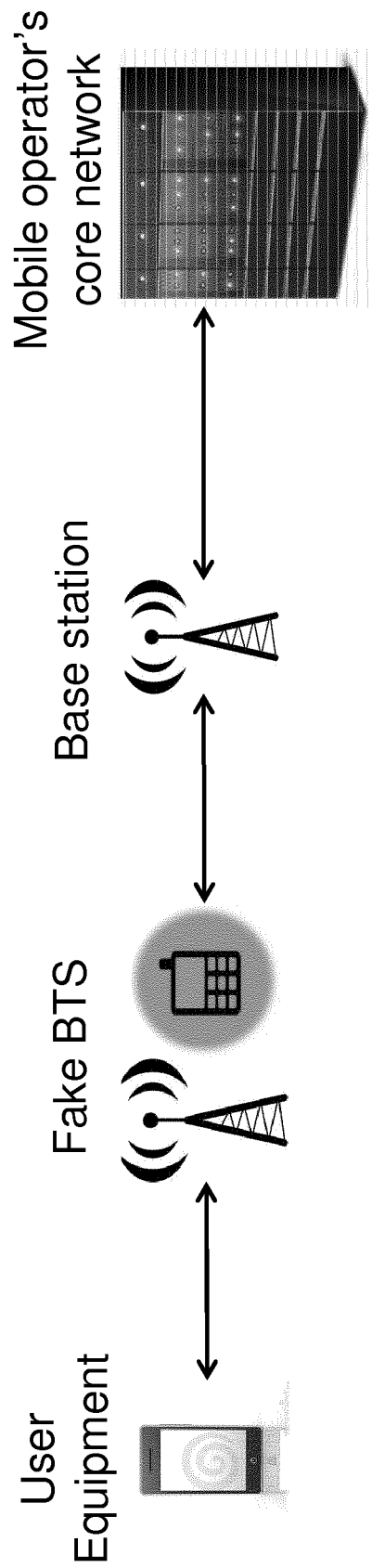
FIG. 2 is an overview illustrating a situation in a communication network when there is a man-in-the-middle attack.

In the following, aspects/embodiments of the present invention are described by referring to general and specific examples of the aspects/embodiments, wherein the features of the aspects/embodiments can be freely combined with each other unless otherwise described. It is to be understood, however, that the description is given by way of example only, and that the described aspects/embodiments are by no means to be understood as limiting the present invention thereto.

As described above, since the A5/1 encryption can now be cracked in real-time, a lot of new attacks are possible, which require a fake base station.

Therefore, the present invention provides a prevention/detection mechanism with the help of the core network, which will be described in detail in the following. For example, it is proposed to use core network support to increase the reliability of the detection. When UE gets suspicious, it can ask for the network service to make it more certain, that is, the network service can be used to confirm or deny the suspicion.

In the telecommunication network only the UE plays the role of a sensor, monitoring the radio frequencies all the time. Therefore, the UE has the best potential (and also the biggest interest) to detect a fake BTS. It can detect suspicious situations (e.g. see CatcherCatcher open source project described in the prior art document [3]), however, alone, it is hard to ensure that it is really a fake BTS.

The invention provides a way for the user equipment to ensure that it talks to a valid BTS with the help of an operator service, utilizing the additional knowledge at the network side.

The problem is to identify whether the UE is connected to a valid BTS. Here, it is assumed that the attack is able to fake the authentication method towards the mobile network, so the valid BTS and the core network think that the fake UE is the original UE, which is not connected to the network directly.

According to the present invention, there are proposed several solutions, where information connection and context information from the UE is compared with connection and context information from the core network obtained by a network service. These information can either be compared at the UE or at the core network, as described later in detail. For example, the UE can securely send some information sensed during the connection to the mobile network operator's service, which can compare it with the information about the real BTS. Further examples are described below. The connection and context information about the real BTS can be obtained directly from the BTS. Important for this solution is the fact that the mobile core network's connection towards the real BTS is hard to be tampered with, so the core network can address the real BTS even if a fake BTS is present in the system. However, it is noted that the information about the real BTS can come from different sources of the network (not just from the BTS), like e.g. a base station controller (BSC), a mobile switching center (MSC) or any other suitable network element. Depending on the deployed mobile network, several other elements can be used. That is, the information can be gathered from multiple sources (e.g. depending on where it is the easier to get from).

Alternatively, the information can also be obtained from some regularly (e.g. once a day) updated database. Hence, no immediate query to the core network/BTS may be required for the decision.

The solution requires a service set up by the operator and an application (maybe it can be a SIM (subscriber identity module) application as well), which needs to be installed to the user equipments, which wish to use the service. The service requires secure access to the base stations of the operator, a private key of the service and its public key at the application part.

One advantage of our solution is that the mobile operator is also informed about these incidents, not only the end user of the UE, enabling further investigations, gathering more evidence or acting against the attackers.

The present invention is mainly directed to eavesdropping prevention and impersonation prevention, but not limited thereto.

Concerning the threat "eavesdropping", a fake BTS is only needed if both the UE and the network support A5/3 (or a future even better algorithm, like A5/4 or the like), because otherwise A5/0 to A5/2 would be used automatically and the attacker could just do passive eavesdropping and encryption cracking, which is hardly detectable.

In the A5/3 case, this would not work, so a fake BTS is needed. The fake BTS must change the message in which the UE sends its capabilities, i.e. remove A5/3 and leave only A5/0 to A5/2 in it (known as 'bid-down attack'). This could be detected easily by requiring that the UE sends in a signed message information about the UE capabilities and what the network negotiated with it. The operator service can compare this information to the information queried from the actual BTS in question. If both the UE and the BTS support A5/3 or even better, and the negotiated encryption is still a weaker one, i.e. one of A5/0 to A5/2, then this is a clear indication of an attack.

For this, to work on the application layer, the UE would need a GPRS bearer. One could imagine a "secure telephony app" that establishes such a bearer, and allows telephony only after it has received and verified the signed message, based on the public key of the network that is distributed e.g. as part of the app. In case the UE that does not support GPRS, the signed message would have to be sent, for example, over SMS (short message service). However, it seems to be unlikely that a future device will support A5/3 or better and does not support GPRS.

Clearly, the approach would also prevent impersonation in this case (e.g. the case where both UE and network want to do A5/3).

Concerning the threat "impersonation", a fake BTS is needed even for the weak algorithms assuming the network enforces an authentication and new key for each call. In many cases, not both the network and the UE will support A5/3. Then the fake BTS doesn't need to change the UE capabilities and the above described detection won't work. So something else is needed.

Therefore, according to the present invention, it is proposed to use such connection characteristics, which are observed at both ends, i.e. at the UE and at the BTS, and can be compared to each other.

Such characteristics can be, but are not limited to, available base stations in the neighbourhood of the UE, position of the UE, sensed position of the BTS, time taken to set up the connection, whether the network initiated an authentication request to this UE, etc. It is still under research what information is useful to gather.

An ideal characteristic we are looking for is one that cannot be faked by an attacker when the UE senses it and its value is known at the network side—so that comparison can reveal the fake BTS.

Figure 3:
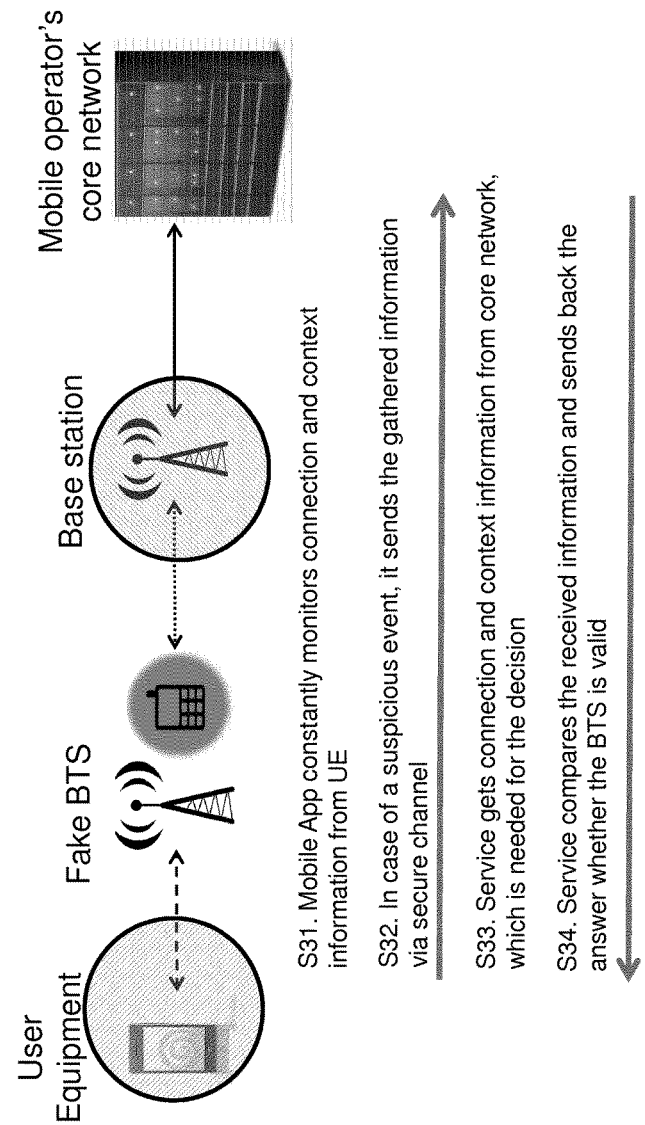
FIG. 3 is a diagram illustrating a first scenario of how to detect a fake base station according to an aspect of the present invention.

FIG. 3 is a diagram illustrating a first scenario of how to detect a fake base station according to an aspect of the present invention.

As shown in FIG. 3, in a step S31, the mobile application installed on the UE constantly monitors connection and context information from the UE. In case the UE observes an suspicious event, the UE sends the gathered information via a secure channel to the mobile operator's core network in a step S32.

Then, in a step S33, the network service set up by the operator gets connection and context information from the core network, which is needed for the decision. The connection and context information can be obtained via a secure channel from the BTS, or from the BSC, MSC or the like. Then, in a step S34, the service compares the information received from the UE with information received from the core network and sends back the information to the UE whether the BTS is valid or not. In particular, when the information received from the UE coincides with the information obtained from the core network, it informs the UE that the BTS is valid. Otherwise, when the information received from the UE differs from the information obtained from the core network, it informs the UE that the BTS is not valid and is most likely a fake base station.

FIG. 4 is a diagram illustrating a second scenario of how to detect a fake base station according to an aspect of the present invention.

As shown in FIG. 4, in a step S41, a user equipment, i.e. a mobile application installed on the user equipment, periodically gets connection and context information from the core network from a network service set up by the operator via a secure channel and stores the information. Further, in a step S42, the mobile application constantly monitors connection and context information from the UE. If there is an observed suspicious event, the mobile application uses the stored information and determines whether the base station is a fake base station. In particular, the information from the core network, which has been stored, is compared to the monitored information from the UE and if the information coincides, it is determined that the base station is valid. However, if the information does not coincide with each other, it is determined that the base station is a fake base station. In such a case, the mobile application of the user equipment may optionally notify the network service in a step S44 via a secure channel that a fake BTS is present.

FIG. 5 is a diagram illustrating a third scenario of how to detect a fake base station according to an aspect of the present invention.

As shown in FIG. 5, in a step S51, a mobile application installed on a user equipment constantly monitors connection and context information from the UE. When the mobile application recognizes a suspicious event, it gets connection and context information from the core network from a network service set up by an operator via a secure channel in a step S52. Then, in a step S53, the mobile application uses the retrieved information in order to determined whether a fake base station is present or not. This is done in a similar manner than the determination as described above with respect to step S43 of FIG. 4. Further, the mobile application of the user equipment may optionally notify the network service in a step S54 via a secure channel that a fake BTS is present.

Thus, according to the present invention, it can be determined whether the UE is connected to a valid base station or to a fake base station.

According to certain aspects of the present invention, the decision can be made on both sides (on device side or service side). That is, the UE can get some information from a service, which is extra information to support the decision. That information can be queried either real-time or periodically and can be stored offline for later use.

If the UE gets aware of a fake BTS, it can terminate the communication, which lowers the eavesdropping to a denial of a service attack.

An advantage of making the decision on the network side is that if the network is aware of a fake BTS, it can cancel impersonation attack, which cannot be influenced from the UE side.

FIG. 6 is a flowchart illustrating processing of the apparatus according to certain aspects of the present invention.

According to an aspect of the present invention, first, in a step S61, an apparatus, i.e. the core network, receives context information from a user equipment, and further, in a step S62, receives context information from a network element. Then, in a step S63, the core network determines whether the context information received from the user equipment coincides with the context information received from the network element.

If the context information received from the user equipment coincides with the context information received from the network element, the core network determines that a base station to which the user equipment is connected, is a valid base station, and transmits a message to the user equipment informing the user equipment that the base station to which the user equipment is connected, is a valid base station.

If the context information received from the user equipment does not coincide with the context information received from the network element, the core network determines that a base station to which the user equipment is connected, is a fake base station, and transmits a message to the user equipment informing the user equipment that the base station to which the user equipment is connected, is a fake base station.

The network element may be, but is not limited to, a base station, a base station controller, or a mobile switching center.

FIG. 7 is a flowchart illustrating another processing of an apparatus according to certain aspects of the present invention.

According to an aspect of the present invention, first, in a step S71, an apparatus, i.e. the core network, receives context information from at least one network element and transmits, upon request from a user equipment, the context information received from the network element to the user equipment in step S72.

FIG. 8 is a flowchart illustrating another processing of an apparatus according to certain aspects of the present invention.

According to an aspect of the present invention, first, in a step S81, an apparatus, i.e. the user equipment which is connected to a base station, monitors context information from the user equipment and transmits the obtained context information to a core network in a step S82. Then, in a step S83, the user equipment receives an indication from the core network whether the base station is valid.

Figure 9:
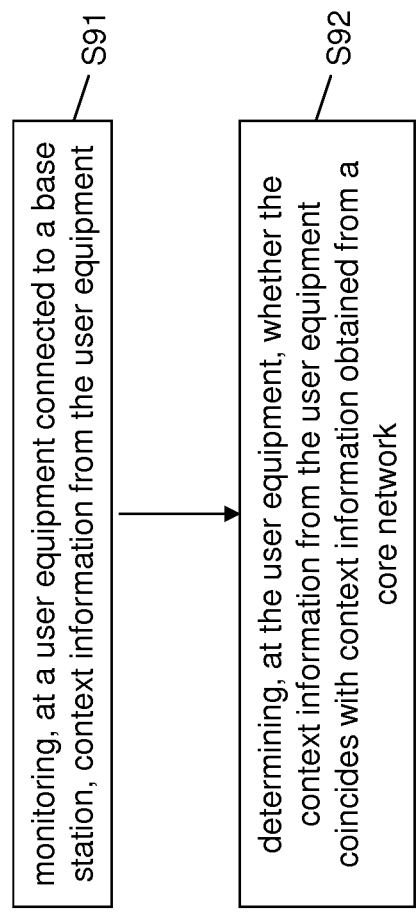
FIG. 9 is a flowchart illustrating another method according to certain aspects of the present invention.

FIG. 9 is a flowchart illustrating another processing of an apparatus according to certain aspects of the present invention.

According to an aspect of the present invention, first, in a step S91, an apparatus, i.e. the user equipment which is connected to a base station, monitors context information from the user equipment. Then, in a step S92, the user equipment determines, whether the context information from the user equipment coincides with context information obtained from a core network.

The context information can be queried periodically by the user equipment from the core network and can be stored.

Further, the context information can be queried from the core network in response to observation of a predetermined event, i.e. a suspicious event is observed by the user equipment.

If the monitored context information from the user equipment does not coincide with the context information obtained from the core network, the user equipment determines that the base station to which the user equipment is connected, is a fake base station and may then optionally transmit a message to the core network informing the core network that the base station to which the user equipment is connected, is a fake base station.

As described above, the context information may include at least one of information about available base stations in the neighborhood of the user equipment, a position of the user equipment, a sensed position of the base station, a time taken to set up a connection between the user equipment and the base station, and information about an indication of an authentication request to the user equipment.

Figure 10:
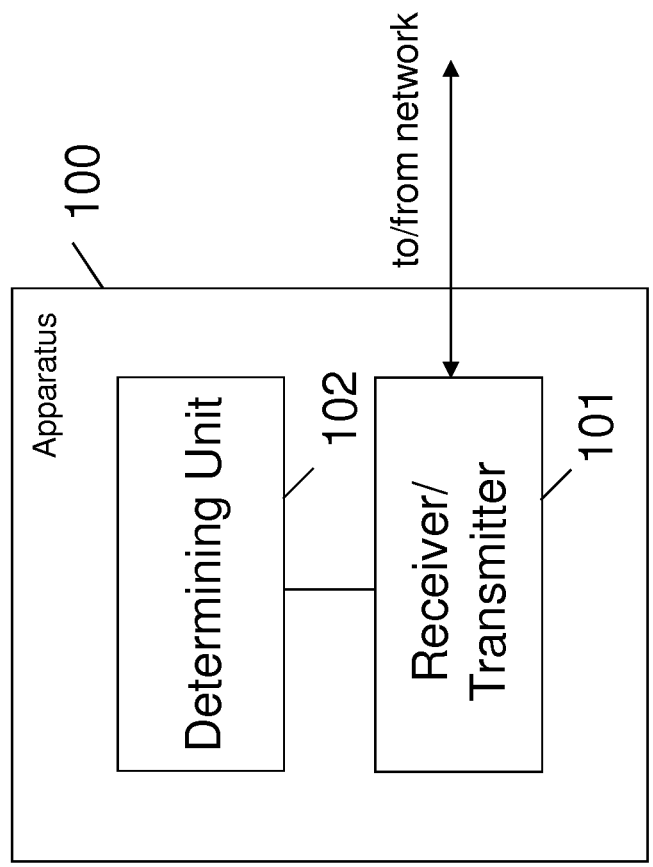
FIG. 10 is a block diagram showing an example of an apparatus according to certain aspects of the present invention.

FIG. 10 is a block diagram showing an example of an apparatus according to certain aspects of the present invention.

According to an aspect of the present invention, the apparatus 100 is a core network and comprises a receiver/transmitter 101 configured to receive context information from a user equipment, and to receive context information from a network element. Further, the apparatus 100 may comprise a determining unit 102 configured to determine whether the context information received from the user equipment coincides with the context information received from the base station.

Alternatively, the receiver/transmitter 101 of the core network is further configured to transmit, upon request from a user equipment, the context information received from the network element to the user equipment.

FIG. 11 is a block diagram showing an example of another apparatus according to certain aspects of the present invention.

According to an aspect of the present invention, the another apparatus 110 is a user equipment and comprises a monitoring unit 112 configured to monitor context information from a user equipment, and a receiver/transmitter 111 configured to transmit the obtained context information to a core network, and to receive an indication from the core network whether the base station is valid.

Further, the user equipment may comprise a determining unit 113 configured to determine whether the context information from the user equipment coincides with context information obtained from a core network.

In the foregoing exemplary description of the apparatus, only the units that are relevant for understanding the principles of the invention have been described using functional blocks. The apparatuses may comprise further units that are necessary for its respective operation. However, a description of these units is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
receiving, at a core network, context information from a user equipment, wherein the context information is information that has been sensed by the user equipment in response to connection to a base station and the user equipment connects to the core network through the base station, wherein the base station may be a fake base station, and, if the base station is a fake base station, the fake base station acts as a base station to the user equipment but acts as another user equipment to another base station, and wherein the user equipment connects to the core network through the fake base station and the other base station, receiving, at the core network, context information associated with the network from at least one network element, wherein the received context information associated with the network is associated with the other base station, determining, at the core network, whether the context information received from the user equipment coincides with the context information received from the network element, and in response to a determination the context information received from the user equipment does not coincide with the context information received from the network element, determining at the core network the base station is a fake base station and canceling by an apparatus of the core network an attack from the base station.

2. The method according to claim 1, further comprising determining, if the context information received from the user equipment coincides with the context information received from the network element, that a base station to which the user equipment is connected, is a valid base station.

3. The method according to claim 2, further comprising transmitting a message to the user equipment informing the user equipment that the base station to which the user equipment is connected, is a valid base station.

4. The method according to claim 1, further comprising determining, if the context information received from the user equipment does not coincide with the context information received from the network element, that a base station to which the user equipment is connected, is a fake base station.

5. The method according to claim 4, further comprising transmitting a message to the user equipment informing the user equipment that the base station to which the user equipment is connected is a fake base station.

6. The method of claim 1, wherein the context information corresponds to information about one or more real base stations determined by the network from directly contacting the one or more real base stations, and wherein one of the one or more real base stations is the other base station.

7. A method, comprising:
determining, at a user equipment connected to a base station, context information that has been sensed by the user equipment in response to connection to the base station by the user equipment, wherein the user equipment connects to a core network through the base station, wherein the base station may be a fake base station, and, if the base station is a fake base station, the fake base station acts as a base station to the user equipment but acts as another user equipment to another base station and the user equipment connects to the core network through the fake base station and the other base station, receiving by the user equipment and from a core network, context information associated with the other base station, determining the base station is a fake base station in response to the context information received from the core network not coinciding with the context information that has been sensed by the user equipment in response to connection to the base station, and in response to a determination that the base station is fake, terminating by the user equipment communication with the base station.

8. An apparatus, comprising:

at least one memory comprising computer program code; and at least one processor, the at least one memory and the computer program code configured, with the at least one processor, to cause the apparatus to perform operations comprising:

receiving, at a core network, context information from a user equipment, wherein the context information is information that has been sensed by the user equipment in response to connection to a base station and the user equipment connects to the core network through the base station, wherein the base station may be a fake base station, and, if the base station is a fake base station, the fake base station acts as a base station to the user equipment but acts as another user equipment to another base station, and wherein the user equipment connects to the core network through the fake base station and the other base station, receiving, at the core network, context information associated with the network from at least one network element, wherein the received context information associated with the network is associated with the other base station, determining whether the context information received from the user equipment coincides with the context information received from the network element, and in response to a determination the context information received from the user equipment does not coincide with the context information received from the network element, determining at the core network the base station is a fake base station and canceling by an apparatus of the core network an attack from the base station.

9. The apparatus according to claim 8, wherein the at least one memory and the computer program code are further configured, with the at least one processor, to cause the apparatus to perform additional operations comprising: determining, if the context information received from the user equipment coincides with the context information received from the base station, that the base station to which the user equipment is connected is a valid base station.

10. The apparatus according to claim 9, wherein the at least one memory and the computer program code are further configured, with the at least one processor, to cause the apparatus to perform additional operations comprising: transmitting a message to the user equipment informing the user equipment that the base station to which the user equipment is connected, is a valid base station.

11. The apparatus according to claim 8, wherein the at least one memory and the computer program code are further configured, with the at least one processor, to cause the apparatus to perform additional operations comprising: transmitting a message to the user equipment informing the user equipment that the base station to which the user equipment is connected is a fake base station.

12. The apparatus according to claim 8, wherein context information includes at least one of information about available base stations in the neighborhood of the user equipment, a position of the user equipment, a sensed position of the base station, a time taken to set up a connection between the user equipment and the base station, and information about an indication of an authentication request to the user equipment.

13. An apparatus, comprising:

at least one memory comprising computer program code; and at least one processor, the at least one memory and the computer program code configured, with the at least one processor, to cause the apparatus to perform operations comprising:

determining, at a user equipment connected to a base station, context information that has been sensed by the user equipment in response to connection to the base station by the user equipment, wherein the user equipment connects to a core network through the base station, wherein the base station may be a fake base station, and, if the base station is a fake base station, the fake base station acts as a base station to the user equipment but acts as another user equipment to another base station and the user equipment connects to the core network through the fake base station and the other base station, receiving, by the user equipment and from a core network, context information associated with the other base station, determining the base station is a fake base station in response to the context information received from the core network not coinciding with the context information that has been sensed by the user equipment in response to connection to the base station, and in response to a determination that the base station is fake, terminating by the user equipment communication with the base station.

14. The apparatus according to claim 13, wherein the receiving context information associated with the other base station further comprises periodically querying the core network for the context information for one or more other base stations and storing the context information.

15. The apparatus according to claim 13, wherein receiving context information associated with the other base station further comprises querying the context information from the core network in response to observation of a predetermined event associated with the base station.

16. The apparatus according to claim 13, wherein the at least one memory and the computer program code are further configured, with the at least one processor, to cause the apparatus to perform additional operations comprising: in response to the determination the base station is fake transmitting a message to the core network informing the core network that the base station to which the user equipment is connected is a fake base station.

17. A computer program product comprising a non-transitory computer-readable medium bearing computer program code embodied therein for use with a computer, the computer program code comprising:
- code for receiving, at a core network, context information from a user equipment, wherein the context information is information that has been sensed by the user equipment in response to connection to a base station and the user equipment connects to the core network through the base station, wherein the base station may be a fake base station, and, if the base station is a fake base station, the fake base station acts as a base station to the user equipment but acts as another user equipment to another base station, and wherein the user equipment connects to the core network through the fake base station and the other base station,
- code for receiving, at the core network, context information associated with the network from at least one network element, wherein the received context information associated with the network is associated with the other base station,
- code for determining, at the core network, whether the context information received from the user equipment coincides with the context information received from the network element, and
- code for, in response to a determination the context information received from the user equipment does not coincide with the context information received from the network element, determining at the core network the base station is a fake base station and canceling by an apparatus of the core network an attack from the base station.

18. A computer program product comprising a non-transitory computer-readable medium bearing computer program code embodied therein for use with a computer, the computer program code comprising:
- code for determining, at a user equipment connected to a base station, context information that has been sensed by the user equipment in response to connection to the base station by the user equipment, wherein the user equipment connects to a core network through the base station, wherein the base station may be a fake base station, and, if the base station is a fake base station, the fake base station acts as a base station to the user equipment but acts as another user equipment to another base station and the user equipment connects to the core network through the fake base station and the other base station,
- code for receiving, by the user equipment and from a core network, context information associated with the other base station,
- code for determining the base station is a fake base station in response to the context information received from the core network not coinciding with the context information that has been sensed by the user equipment in response to connection to the base station, and
- code for, in response to a determination that the base station is fake, terminating by the user equipment communication with the base station.

* * * * *